United States Patent [19]
Goergen

[11] Patent Number: 5,913,780
[45] Date of Patent: Jun. 22, 1999

[54] METHOD AND DEVICE FOR PROTECTION AGAINST ROOSTING BIRDS

[76] Inventor: Terrence John Goergen, 84 Aldridge Avenue, Stanmore Middlesex HA7 1DD, United Kingdom

[21] Appl. No.: 08/377,769

[22] Filed: Jan. 24, 1995

[30]       Foreign Application Priority Data

Jan. 24, 1994 [GB] United Kingdom .................... 9401236

[51] Int. Cl.⁶ .............................. E04B 1/72; E04F 19/00
[52] U.S. Cl. ......................... 52/101; 52/745.21; 156/295
[58] Field of Search .................... 52/101, 720.1, 52/737.1, 737.6, 287.1, 288.1, 745.21; 156/71, 94, 295; 264/273

[56]                References Cited

U.S. PATENT DOCUMENTS

| | | | |
|---|---|---|---|
| 678,687 | 7/1901 | Roth | 52/288.1 |
| 892,571 | 7/1908 | Armstrong | 52/300 |
| 1,003,871 | 9/1911 | Campfield | 52/300 |
| 2,193,994 | 3/1940 | Weaver | 52/737.6 |
| 3,478,482 | 11/1969 | Weir | 52/300 |
| 3,783,931 | 1/1974 | Assael | 52/288.1 |
| 4,269,008 | 5/1981 | Assouline | 52/101 |
| 5,400,552 | 3/1995 | Negre | 52/101 |

FOREIGN PATENT DOCUMENTS

| | | |
|---|---|---|
| 4277385 | 11/1985 | Australia . |
| 55-131313 | 9/1980 | Japan .................................... 52/101 |
| 6284848 | 10/1994 | Japan .................................... 52/101 |

*Primary Examiner*—Michael Safavi
*Attorney, Agent, or Firm*—Michael Y. Epstein

[57]                ABSTRACT

The device (30) comprises a triangular hollow section having a apertures (5) in its mutually perpendicular sides. It is mounted on a ledge (L) of a building and has an upper surface which is inclined sufficiently to prevent birds, paticularly pigeons, from roosting thereon and depositing droppings on the building and surrounding pavement. It can be attached to the ledge by applying adhesive foam filler to the ledge surfaces (L, V) and pushing the device against the foam so as to force the foam through the apertures, whereupon it expands within the interior of the section and grips the inner surface thereof. The device can also be mounted on the exterior horizontal surfaces of beams and girders, e.g. under railway bridges.

3 Claims, 2 Drawing Sheets

METHOD AND DEVICE FOR PROTECTION AGAINST ROOSTING BIRDS

The present invention relates to a method of protecting an external structure (e.g. a building or a bridge) or its surroundings from roosting birds (e.g. pigeons) whose droppings constitute a nuisance and a health hazard. The invention also relates to a device for preventing or inhibiting birds form roosting on a ledge portion of an external structure, such as the ledge of a building or a horizontal flange of a girder for example.

Hitherto, numerous attempts have been made to dissuade pigeons and other birds from roosting on exposed beams or girders of bridges and other external structures but have met with little success. For example tacky material has been applied to the horizontal surfaces of such structures in order to prevent birds form perching there, but it has been found that the material loses its tack in cold weather or after an extended period of use. Various bird scaring devices are also known, but often lose their effectiveness after a short period, when the birds get used to them.

Accordingly the problem of preventing birds from roosting on the ledges of buildings and under bridges has remained unsolved, and the resultant cost of cleaning the pavement beneath such structures runs into several millions of pounds per annum. Frequently the structures themselves need cleaning from the bird droppings, which represents a further expense.

In one aspect the invention provides a method of protecting an external structure or its surroundings from roosting birds, comprising mounting over a substantially horizontal elevated surface of said structure a member whose upper surface is inclined sufficiently to prevent birds from roosting on said upper surface.

Preferably the inclination of said upper surface is at least 10 degrees, more preferably at least 20 degrees, and is desirably at least 30 or 40 degrees.

Depending on the inclination of the upper surface, it has been found that a bird (such as a pigeon or a seagull for example) either slides off when it attempts to perch on it, or finds it too awkward to perch there for any length of time.

The invention also provides a device for preventing or inhibiting birds form roosting on aledge portion of an external structure, said device being in the form of a lightweight strip having mounting means which enables said strip to be mounted on a horizontal or vertical surface of such a ledge portion with an upper surface of the strip inclined at an angle which is sufficiently great to prevent or inhibit birds from roosting on said strip.

The strip may for example have a pattern or colouring (e.g. to represent brickwork) which enables it to blend in with the external structure on which it is to be mounted, or it may for example be transparent or translucent in order to reveal the form of the structure behind it.

Preferred embodiments of the invention are described below by way of example only, with reference to FIGS. 1 to 4 of the accompanying drawings wherein.

Figure 1:
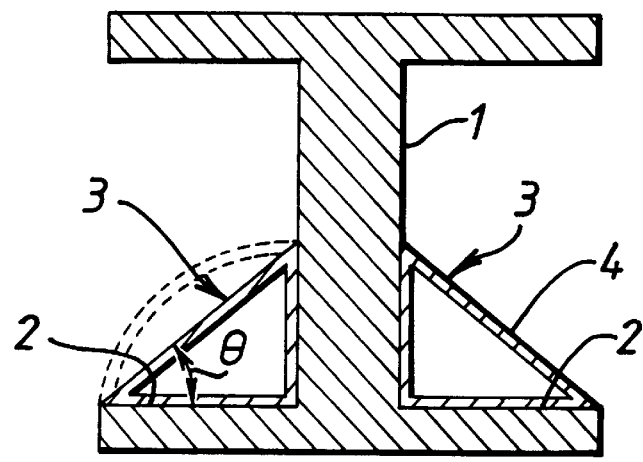
FIG. 1 is a transverse cross-section of a grider protected in accordance with the invention.

Referring to FIG. 1, a steel girder 1 is shown, having the upper horizontal surfaces 2 of its lower flange portion covered by strips 3 in accordance with the invention. Each strip 3 is in the form of a hollow right-angled triangular section of extruded plastics material, such as polyethylene or polypropylene for example, and because it does not have any structural function may be of very lightweight construction.

Each strip 3 has a smooth flat upper surface 4, which is inclined downwardly towards the outer edge of surface 2 by an angle $\theta$ which may be 45 degrees, for example. Accordingly any pigeons which attempt to land on surface 4 slide off immediately, and do not have the opportunity to deposit droppings on the region below the girder. The strips 3 can be bolted or clipped to the girder 1 or can be attached to surface 2 by a film of adhesive. Alternatively, the upper surface 4 may be convex as can been seen by dash lines in FIG. 1.

Figure 2:
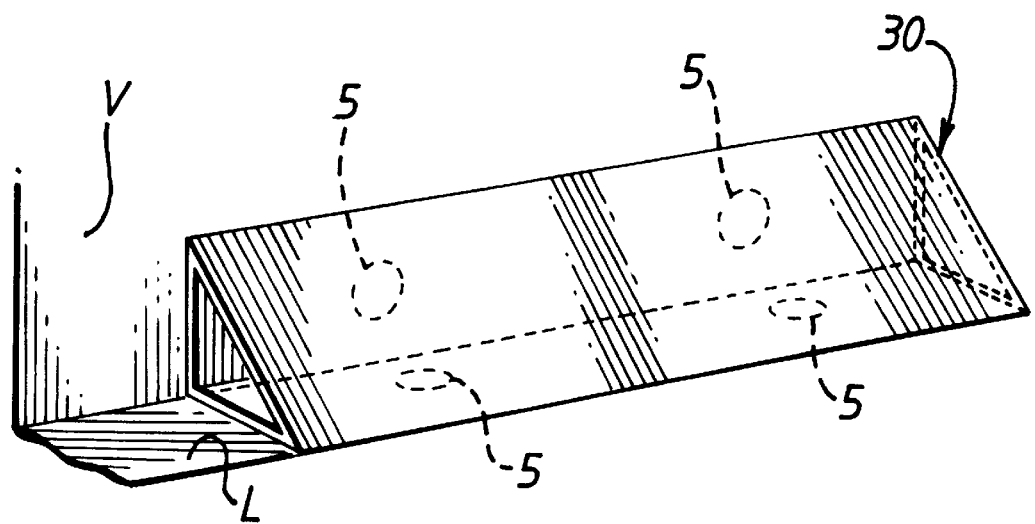
FIG. 2 is a sketch perspective view of a ledge of a building protected with a strip in accordance with the invention.

Referring to FIG. 2, a second embodiment 30 is shown mounted on an elevated ledge L of a building with its rear face in contact with the external surface V of the wall of the building. The strip 30 is provided with apertures 5 in its mutually perpendicular sides but is otherwise similar to the strip 3 of FIG. 1.

Figure 3:
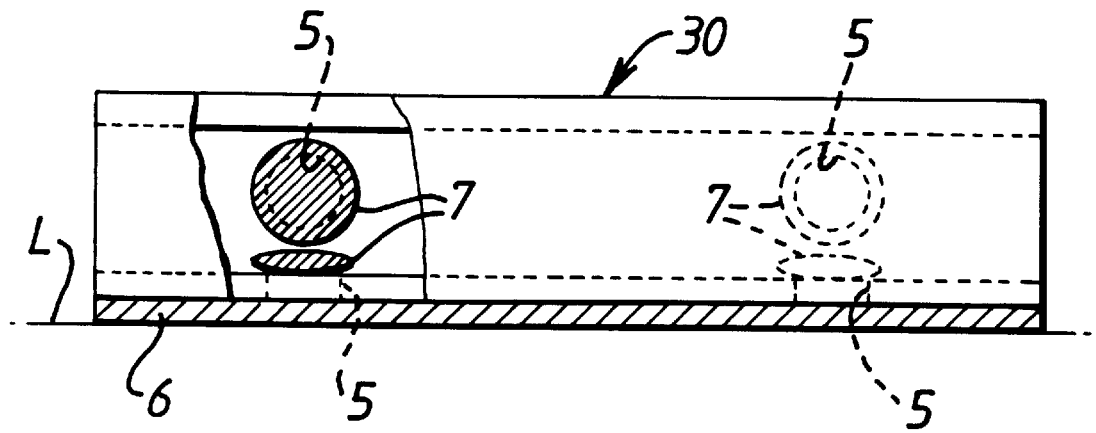
FIG. 3 is a front elevation of the strip of FIG. 2, partially cut away to reveal how it is fixed to the ledge.

The method of fixing strip 30 to the ledge is illustrated in FIG. 3. A layer 6 of adhesive polyurethane foam is first applied to ledge surface L and V and the strip is then applied to this foam layer, forcing the foam to flow through the apertures 5 and expand to form buttons 7 of foam within the interior of the section, as can be seen most clearly in the cut-away portion of the FIG. Such is commercially available as a one-part composition which can be applied from a nozzle applicator and is commonly used for fixing door frames, window frame and the like to brickwork. It cures within about 40 minutes on exposure to ambient moisture and typically expands to two to three times its original volume prior to cure. Accordingly the buttons of foam 7 harden and grip the interior of the strip, securing it firmly to ledge L. It may be necessary to wet the surface of ledge L prior to applying the foam.

The strip 30 of FIGS. 3 and 3 functions in the same manner as the strips 3 of FIG. 1.

The preferred method of fixing illustrated in FIG. 3 can also be used to fix the strips 3 of FOG. 1 to the girder 1, and has the advantages:

a) that it can be carried out very quickly and easily by one man working on a vehicle-mounted platform e.g. of the type used by local authorities for maintaining street lights, b) that any slight irregularities in the mounting surface of the ledge, beam or girder (due e.g. to bolt heads) are accommodated by the thickness of the foam layer 6 and do not prevent the strip from being firmly bonded, and c) that the strip can easily be removed if and when it becomes necessary to carry out maintenance work on the underlying structure, simply by running a knife blade under foam layer 6.

Finally it should be noted that the method of fixing described above is believed to be novel and inventive in its own right and can be applied to any material e.g. in sheet or srip form having apertures through which adhesive foam or other adhesive filler can flow.

Figure 4:
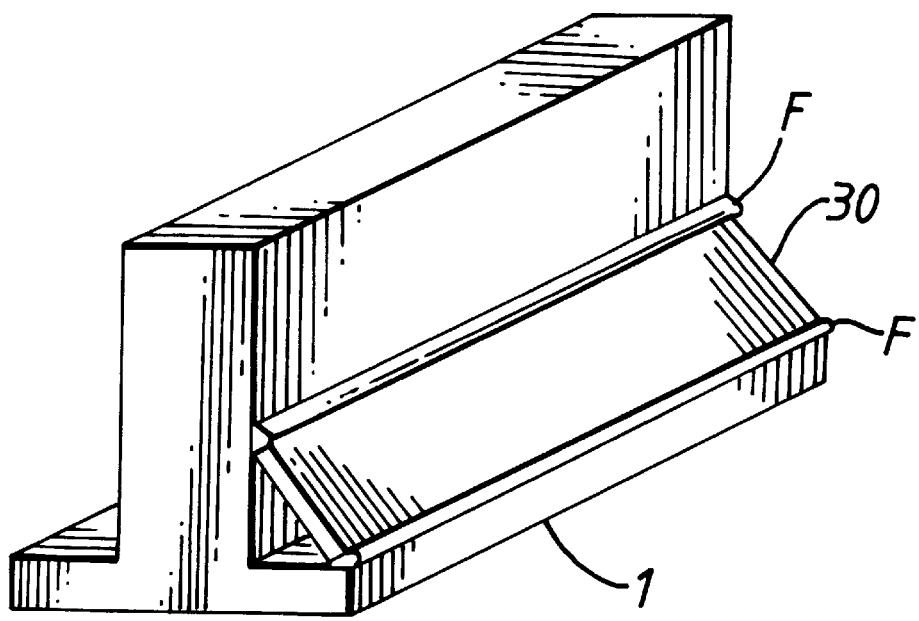
FIG. 4 shows a further girder protected in accordance with the invention.

A preferred embodiment of the invention is shown in FIG. 4. A girder 1 in an elevated position on a bridge for example is protected with a strip 30 of extruded plastics material such as polyethylene for example. The strip is inclined at an angle of about 45 degrees and is fixed to the horizontal and vertical surfaces of the girder by beads F of adhesive polyurethane foam.

I claim:

1. A device for preventing or inhibiting birds from roosting in combination with an outdoor structure having an elevated, exterior ledge on which birds would normally roost, said ledge including adjoining horizontal and vertical surfaces, said device being in the form of a lightweight strip mounted on one of said surfaces with an upwardly facing surface of the strip being inclined at an angle which is sufficiently great to prevent or inhibit birds from roosting on said strip, said device being in the form of an extruded hollow section having a right-angled cross-section including vertical and horizontal sides, one of which sides being engaged with one of said vertical and said horizontal surfaces of said ledge, and said vertical and horizontal sides being joined by a convex hypotenuse side forming said device upwardly facing surface.

2. A method of protecting an outdoor structure from roosting birds, comprising mounting on an elevated, first exterior surface of said structure a member in the form of a hollow section having an upwardly facing, second exterior surface which is inclined sufficiently to substantially prevent birds from roosting on said second exterior surface, said member having a mounting surface in which one or more apertures are formed, and mounting said member on said first exterior surface of said structure by applying an adhesive curable foam material filler to said first exterior surface and allowing said filler to flow through said one or more apertures while the member is held with its mounting surface against said first exterior surface.

3. A method of protecting an outdoor structure from roosting birds comprising mounting on an elevated, first exterior surface of said structure a member having an upwardly facing, second exterior surface which is inclined sufficiently to substantially prevent birds from roosting thereon, said member having a mounting surface in which one or more apertures are formed, and said member being mounted on said first exterior surface by applying an adhesive curable foam material filler to said first exterior surface and allowing said filler to flow through said one or more apertures while the member is held with its mounting surface against said first exterior surface.

* * * * *